J. REILY.
HARVESTER.
No. 348. Reissued Jan. 29, 1856.
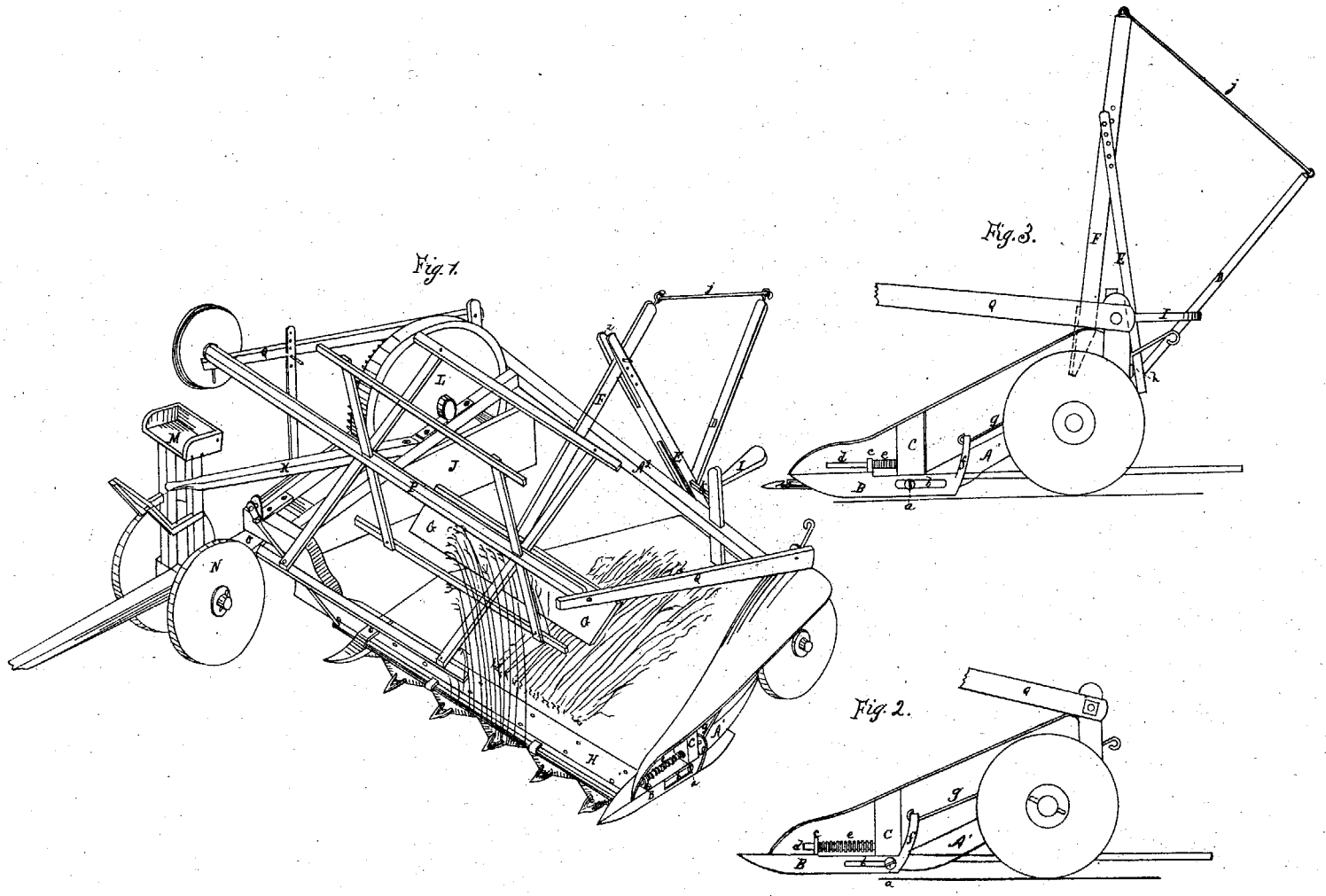

UNITED STATES PATENT OFFICE.

JOHN REILY, OF HART PRAIRIE, WISCONSIN.

IMPROVEMENT IN HARVESTING-MACHINES.

Specification forming part of Letters Patent No. 13,828, dated November 20, 1855; Reissue No. 348, dated January 29, 1856.

*To all whom it may concern:*

Be it known that I, JOHN REILY, of Hart Prairie, in the county of Walworth and State of Wisconsin, have invented a new and useful Improvement in Harvesting-Machines; and I do hereby declare the following to be a full, clear, and exact description of the same, reference being had to the accompanying drawings, which make part of this specification, and in which—

Figure 1 represents a view in perspective of a machine embracing my improvements, showing the grain-guard in position to receive and support the grain as it is cut. Fig. 2 represents an elevation of the side next the standing grain, showing the adjustable divider projected forward, as when operating; and Fig. 3, a similar view, showing the divider retracted, as in turning corners, &c., and the guard in position to permit the cut grain to fall upon the platform, preparatory to being removed by the raker.

In harvesting grain with reaping-machines it has been found necessary, in an economical point of view, either to cut round the whole field or to subdivide it into what are called "squares" when so large and irregular in form as to create inconvenience, round which the machine is caused to pass until the whole has been cut; but in the accomplishment of this serious loss and inconvenience are occasioned from the beating down of the grain by the protruding divider as the corners are turned. Many farmers, with a view to save the grain, cause the machine to cut the swath completely out and then turn it again into the grain on the next side of the square; but from the space taken to turn such a large and unwieldy machine it is compelled to enter at a point considerably distant from that at which the last swath ended. Such a course as this not only consumes time, but from the irregular manner in which the corners are left creates extra labor, inasmuch as they require to be cut down separately, either by the machine after the mass of the square is finished or by an extra cradler for the purpose.

To remedy these defects constitutes the first branch of my invention; and it consists in so constructing and arranging the divider as to make it capable of being drawn back flush with the cutter-bar whenever it is desired to turn the machine, or for any other purpose in which it would be more advantageous to have it in that position than as protruded—as, for example, in surmounting stumps, stones, or other obstacles in the way of the machine. In this respect it has been found of great benefit, as the machine is enabled to pass over steeper ridges and deeper furrows undamaged than has been possible heretofore, and it has also been found of especial service in mowing.

Another serious defect experienced in the use of reaping-machines arises from the tangling of the falling grain as it is cut with that being removed from the platform by the raker. Frequent attempts have been made to remedy this defect by the various inventors of reapers, but thus far without success, their efforts to accomplish it having been in almost every instance directed as a means to finding the most convenient location for the raker's seat or stand, in order to remove the grain with the greatest facility and to deposit it on the ground in the most compact and even bundle possible under the circumstances; but however well they may be enabled to do that by virtue of this position and by dint of great experience and practice, it must be evident that no position, however favorable, nor any degree of skill in the art of raking can ever enable them effectually to accomplish it without first removing the cause—that is to say, unless they prevent the grain as it is cut from falling upon that being removed.

To accomplish this desideratum is the object of the second branch of my invention; and it consists in so constructing and arranging a grain-guard as to receive and support all the grain as it is cut while that which has been deposited upon the platform is being removed by the raker, and then permitting that which has accumulated upon it during this operation to drop down and be removed in turn. The whole, in this instance, being so arranged as to be operated by the raker without inconvenience or excess of labor; but, if deemed necessary, it may be operated automatically.

Before proceeding particularly to describe my improvements, I may here mention that they are applicable to almost every class of harvesting-machines, and, as their general construction is well known to every one conversant with such machines, I will not particularly describe such parts as are unnecessary to the proper understanding of my invention.

My improvements are here represented as attached to that class of machines having swinging platforms to facilitate the removal of the grain, the front being hinged to the finger-bar H and the rear to the raker's seat I, the grain as removed being thrown against the straightening-board J, by which it is laid evenly upon the ground; and is further represented as having an adjustment to raise and lower the cutter-bar H to enable it to override obstructions, the lever K for this purpose being firmly bolted at one end to the inside rail of the frame that supports the driving-wheel L and gear and projecting forward to the side of the driver's seat M, which is mounted on a truck-carriage, N, and connected to the frame by the curved beam O, the reel P being supported by bearers Q from the rear of the machine.

To the front end of the beam or rail A′ of the frame A, and on the side next the standing grain, is secured an adjustable divider, B, (for the separation of the grain to be cut from that to be left standing,) by means of a bolt, *a*, passing through a slot, *b*, into the frame, the slot running longitudinally with the beam to permit the divider to be freely protruded and retracted, as circumstances may require. On the upper side of this divider, which may either be made of metal or wood, as the judgment of the construction may deem most suitable, projects a standard or lug, *c*, having a mortise through it for the reception of a guide-pin, *d*, over which it slides, and which is firmly secured to the standard C. Round this pin, between the lug and standard, is wound a helical spring, *e*, for the purpose of projecting the divider when it should be deemed unnecessary to keep it longer in its withdrawn position. On the rear end of the divider projects another lug or standard, *f*, to the upper extremity of which is secured a rod, *g*, in any suitable manner, extending back to and within convenient reach of the raker, by whom, in this instance, the retraction and protrusion of the divider is intended to be effected. This mode of operating is simple and effective, as all that is necessary to withdraw the divider is to pull the rod, and to project it is to free it from the hand, when the spring will cause it to protrude; but this may be varied in many ways and the divider itself caused to assume many forms and modifications without in the least altering the principle of my invention—as, for example, in the operating of the divider a lever may be pivoted to the frame at a point intermediate between the handle and the end by which it is connected to the divider, which, by being pushed back and forth, would cause the divider to be protruded or retracted, as required, there being a bar with a series of notches made fast to the frame to receive the lever, by which the divider could be kept in any required position, and the spring be dispensed with, although not necessarily so; or, instead of the raker being the operator, it may, by means of suitable devices, be operated by the driver.

From the rear cross-bar, $A^2$, and passing through a mortise in the arm E, arises a standard, D, having a backward inclination, to the lower end of which is jointed the arm E, which projects upward toward the front of the machine, and has a constant tendency toward the standard D, because of the pressure of the spring *h* exerted against its under side. On the upper extremity of this arm is a saw-cut, *i*, through the sides of which are pierced a series of holes for the reception of a bolt, on which is hinged an arm, F, having another series of holes and fitting loosely in the saw-cut, these holes being intended to raise or lower the arm F, as required to suit the varying lengths of grain, the upper end of this arm being connected with the top of the standard D by the link-rod *j*. On the lower extremity of this arm F is firmly bolted the guard-board G for the purpose of receiving and supporting the grain as it is cut, to prevent it from becoming entangled with the grain already deposited upon the platform and in the act of being removed by the raker.

On the side of the arm E next to the raker's seat is fastened a handle, *k*, by which the whole is operated by the raker in any convenient manner; or the upper end of a link-rod may be attached to the under side of the arm E and the lower to a treadle and operated by the raker's foot, by depressing either of which the arm E would be caused to incline more toward the platform and the guard be projected forward in the position represented in Fig. 1, and on the removal of the depressing force be thrown back in the position shown in Fig. 3; or, if deemed necessary, the whole may be operated automatically.

Having thus fully described my invention, what I claim as new, and desire to secure by Letters Patent, is—

1. The retracting divider, substantially as described.

2. The grain-guard, substantially as described.

In testimony whereof I have hereunto subscribed my name.

JOHN REILY.

Witnesses:
P. HANNAY,
WM. M. SMITH.